(12) United States Patent
Chakraborty et al.

(10) Patent No.: US 11,032,245 B2
(45) Date of Patent: Jun. 8, 2021

(54) COGNITIVE STATEFUL FIREWALL FOR IOT DEVICES

(71) Applicant: International Business Machines Corporation, Armonk, NY (US)

(72) Inventors: Supriyo Chakraborty, White Plains, NY (US); Dinesh C. Verma, New Castle, NY (US); Seraphin B. Calo, Cortlandt Manor, NY (US)

(73) Assignee: International Business Machines Corporation, Armonk, NY (US)

(*) Notice: Subject to any disclaimer, the term of this patent is extended or adjusted under 35 U.S.C. 154(b) by 317 days.

(21) Appl. No.: 15/796,345

(22) Filed: Oct. 27, 2017

(65) Prior Publication Data
US 2019/0132290 A1    May 2, 2019

(51) Int. Cl.
| | |
|---|---|
| *H04L 29/06* | (2006.01) |
| *G06F 21/53* | (2013.01) |
| *G05B 17/02* | (2006.01) |
| *H04L 29/08* | (2006.01) |
| *H04W 12/088* | (2021.01) |
| *H04W 4/70* | (2018.01) |

(52) U.S. Cl.
CPC .......... *H04L 63/0254* (2013.01); *G05B 17/02* (2013.01); *G06F 21/53* (2013.01); *H04L 63/1416* (2013.01); *H04L 67/125* (2013.01); *H04W 12/088* (2021.01); *H04L 63/0263* (2013.01); *H04L 63/0272* (2013.01); *H04L 63/20* (2013.01); *H04W 4/70* (2018.02)

(58) Field of Classification Search
CPC ............. H04L 63/0254; H04L 63/0263; H04L 63/0272; H04L 63/20; G06F 21/53
USPC .......................................................... 726/11
See application file for complete search history.

(56) References Cited

U.S. PATENT DOCUMENTS

| | | | |
|---|---|---|---|
| 9,563,771 | B2 | 2/2017 | Lang et al. |
| 10,298,604 | B2* | 5/2019 | Epstein ............... H04L 63/0861 |
| 2012/0023554 | A1* | 1/2012 | Murgia ................. H04L 63/102 |
| | | | 726/4 |

(Continued)

OTHER PUBLICATIONS

Anonymous, "Solving Asymmetric Routing in a Stretched Data Center Environment Using Firewall Clustering and Fabric Path," An IP.com Prior Art Database Technical Disclosure, IP.com No. IPCOM000233937D, IP.com Electronic Publication Date: Jan. 2, 2014, 3 pgs.

(Continued)

*Primary Examiner* — Mohammad W Reza
*Assistant Examiner* — Moeen Khan
(74) *Attorney, Agent, or Firm* — Kulsoom Z. Hasan

(57) ABSTRACT

Embodiments of the present disclosure include a method, computer program product, and system for determining to push a data packet to a device. A processor may receive a first data packet. The processor may execute the first data packet in a secure environment. The secure environment may simulate a first state of a device. The device may include a firewall. The processor may determine, from the execution of the first data packet, that the first state changed to a second state. The processor may identify that the second state is a predetermined secure state. The processor may push the data packet to the device in response to identifying that the second state is the predetermined secure state.

12 Claims, 6 Drawing Sheets

(56) References Cited

U.S. PATENT DOCUMENTS

| | | | | |
|---|---|---|---|---|
| 2012/0180134 A1* | 7/2012 | Coughtrey | ............ | G06F 21/606 726/26 |
| 2015/0249672 A1* | 9/2015 | Burns | ..................... | H04L 12/66 726/4 |
| 2016/0212099 A1* | 7/2016 | Zou | ..................... | H04L 63/0263 |
| 2016/0226954 A1* | 8/2016 | Lee | ........................ | G06F 3/1415 |
| 2017/0006141 A1 | 1/2017 | Bhadra | | |
| 2017/0093915 A1* | 3/2017 | Ellis | ........................ | H04L 63/20 |
| 2018/0314597 A1* | 11/2018 | Zhang | ................. | G06F 11/1451 |

OTHER PUBLICATIONS

Anonymous, "Cognitive IoT Gateway Simulating Homeowner Presence," An IP.com Prior Art Database Technical Disclosure, IP.com No. IPCOM000248519D, IP.com Electronic Publication Date: Dec. 12, 2016, 5 pgs.

Cujo, "Cujo Smart Firewall—Stay Safe Online," https://www.getcujo.com/, printed Sep. 12, 2017, 11 pgs.

Goergen et al., "A Semantic Firewall for Content-Centric Networking," http://ieeexplore.ieee.org/document/6573021, Integrated Network Managemetn (IM 2013), 2013 IFIP/IEEE International Symposium on, pp. 478-484, May 27-31k, 2013.

Jain et al., "In-Line Distributed and Stateful Security Policies for Applications in a Network Environment," An IP.com Prior Art Database Technical Disclosure, IP.com No. IPCOM000247202D, IP.com Electronic Publication Date: Aug. 16, 2016, 13 pgs., © 2016 Cisco Systems, Inc.

Mell et al., "The NIST Definition of Cloud Computing," Recommendations of the National Institute of Standards and Technology, U.S. Department of Commerce, Special Publication 800-145, Sep. 2011, 7 pgs.

RATtrap, "Security and privacy for your smart home," http://www.myrattrap.com/technology, printed Sep. 12, 2017, 5 pgs.

Reddy et al., "Security for Internet of Things Devices Participating in Group Communications," An IP.com Prior Art Database Technical Disclosure, IP.com No. IPCOM000248165D, IP.com Electronic Publication Date: Nov. 2, 2016, 5 pgs., © Cisco Systems, Inc.

Wikipedia, "Comparison of Firewalls," https://en.wikipedia.org/wiki/Comparison_of_firewalls, printed Sep. 12, 2017, 4 pgs.

Wikipedia, "Firewall (computing)," https://en.wikipedia.org/wiki/Firewall_(computing), printed Sep. 12, 2017, 1 pg.

Wikipedia, "Stuxnet," https://en.wikipedia.org/wiki/Stuxnet, printed Sep. 12, 2017, 20 pgs.

* cited by examiner a # COGNITIVE STATEFUL FIREWALL FOR IOT DEVICES

BACKGROUND

The present disclosure relates generally to the field of firewall security, and more specifically to protecting client devices and servers connected to the internet-of-things (IoT) by use a stateful firewall.

The IoT consists of multiple devices (e.g., client devices and servers) connected via a network. The network allows the devices to intercommunicate with one another by transferring and receiving data. As of today, there has been an increase in the number of devices connected to the IoT. With the increase of connected devices, each device connected to the IoT is vulnerable to possible malfeasance.

SUMMARY

Embodiments of the present disclosure include a method, computer program product, and system for determining to push a data packet to a device. A processor may receive a first data packet. The processor may execute the first data packet in a secure environment. The secure environment may simulate a first state of a device. The device may include a firewall. The processor may determine, from the execution of the first data packet, that the first state changed to a second state. The processor may identify that the second state is a predetermined secure state. The processor may push the data packet to the device in response to identifying that the second state is the predetermined secure state.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
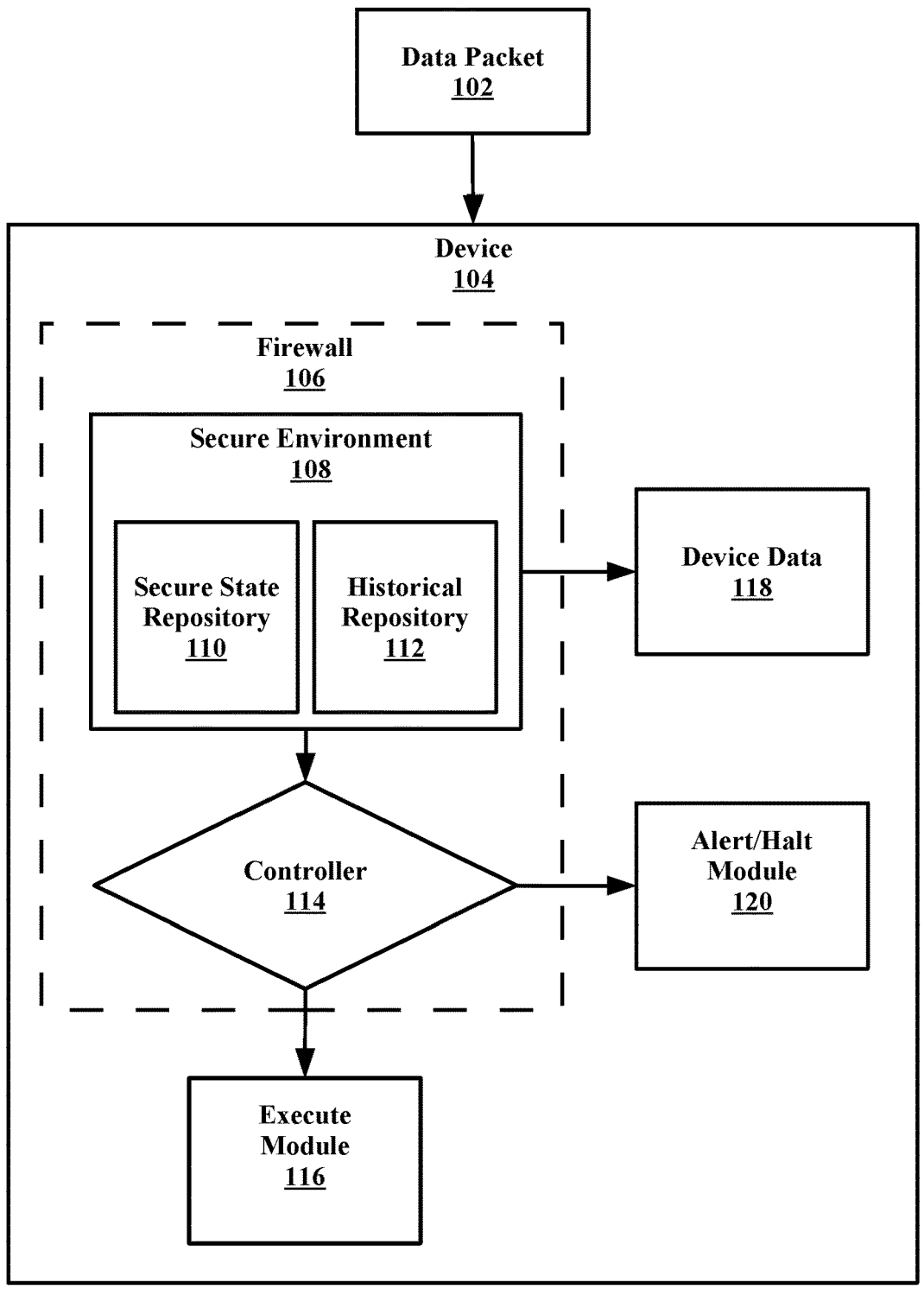
FIG. 1 depicts a block diagram of an example system for determining whether to allow a data packet to be processed by a device, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of firewall security, and more specifically to protecting client devices and servers connected to the internet-of-things (IoT) using a stateful firewall. While the present disclosure is not necessarily limited to such applications, various aspects of the disclosure may be appreciated through a discussion of various examples using this context.

A user owning a device (e.g., a smartphone, a washer, a dyer, a server, etc.) connected to the IoT may desire to protect their device by both monitoring outgoing and incoming data. Typically, though, protections for IoT connected devices only include a firewall that monitors incoming data, and blocks incoming data that is determined, from a predefined list of threats, to be a threat to an IoT connected device. As such, the user may turn to a stateful firewall (e.g., a firewall that includes a simulated environment that functions as a state machine that begins in a first state and upon execution of a command transitions to another state) that examines and/or executes incoming and outgoing data in a simulated environment.

In some embodiments, a processor (e.g., running stateful firewall software on a client-side device) may receive a first data packet (e.g., containing one or more commands). The processor may execute the first data packet in a secure environment (e.g., a simulated environment, a sandbox environment, etc.). In some embodiments, the secure environment simulates a first state of a device. In some embodiments, the device may include a firewall. The processor may determine, from the execution of the first data packet, that the first state changed to a second state. The processor may identify that the second state is a predetermined secure state. The processor may push the data packet to the device in response to identifying that the second state is the predetermined secure state.

For example, a user may be out of their house on a jog. The user may have an IoT connected thermostat and decide that they want a cool house to return to. The user may open an application on their smartphone that is associated with the thermostat and set the thermostat, from their smartphone, to 70 degrees Fahrenheit. A firewall programmed into the thermostat may receive the command to cool the house to 70 degrees, but before forwarding to the command to the thermostat control unit, the firewall may execute the command in a simulated environment that is separate from a runtime environment that would actually make the thermostat react to the command.

The simulated environment in the firewall would take a snapshot of the thermostat at the moment the command is received. The thermostat may be set for 75 degrees. The firewall may then execute the command in the simulated environment and identify that the thermostat would transition from 75 degrees (e.g., the first state) to 70 degrees (e.g., the second state). The firewall may determine that this is in an acceptable range of temperatures and push the command to the thermostat to actually execute and perform the cooling of the house.

In some embodiments, the firewall may additionally confirm the credentials of the entity sending the command. That is, the firewall may identify that the owner of the house is the one sending the command. The firewall may give more weight to the owner of the house sending the command versus an unknown source. In some embodiments, the firewall may determine what is an acceptable range of temperatures from information installed on the thermostat by the manufacturer. The information may be programmed into the thermostat (e.g., an IoT client) and accessed by an IoT server during bootstrap, which may direct how the thermostat should be used, or may identify what the thermostat is authorized to do. For example, the manufacturer may identify that most individuals desire a room temperature between 65 degrees and 80 degrees. Thus, if anything (e.g., a received command to set the thermostat, a received packet with instructions for setting the thermostat, or the result after execution in the test environment) is over or under those temperatures, more scrutiny must be given to the command (e.g., confirming the of the credentials of the entity sending the command).

In some embodiments, when determining that the first state changed to a second, predetermined secure state, the processor may access a repository of one or more predetermined secure states. The processor may then or additionally identify that the second state corresponds to at least one of the one or more secure states. Following the example above, the firewall would access the manufacturer installed information and identify that 70 degrees, as requested by the user, is within the range of 65 degrees to 80 degrees. Upon the identification of 70 degrees within the range, the firewall may determine that 70 degrees is an acceptable command to push to the thermostat control unit (e.g., included in the thermostat device) to actually execute.

In some embodiments, the processor may receive a second data packet. The processor may execute the second data packet in the secure environment. The secure environment may simulate the second state of the device (e.g., the device may retain the second state after being pushed and executing the first data packet). The processor may determine, from the execution of the second data packet, that the second state changed to a third state. The processor may identify that the third state is an insecure state. The processor may halt the pushing of the second data packet to the device in response to identifying that the third state is the insecure state and alert a user (e.g., an owner of the device) to the halting.

Again, following the example above, the thermostat recently changed to 70 degrees may receive a second command at the firewall. The second command may be from a hidden user that requests to cool the house even further, to 30 degrees. Upon receiving the second command, the firewall may take a snapshot of the thermostats state at that moment, 70 degrees, and mimic the 70-degree state of the thermostat in the simulated state. The firewall may then execute the second command in the simulated environment and determine that the thermostat would change from 70 degrees (e.g., the second state) to 30 degrees (e.g., the third state).

The firewall, identifying from manufacturer relayed information that a room temperature between 65 degrees and 80 degrees is desirable may identify that the 30 degrees does not fall within that range and halt the pushing of the second command, thereby stopping the actual execution of second command by the thermostat and keeping the house at 70 degrees. The firewall may additionally generate an alert that is received on the user's smartphone. The user may not have been the one who initiated the second command and may now be induced by the alert to take the necessary precautions in securing their thermostat (e.g., changing network passwords, etc.).

In some embodiments, when determining that the second state changed to a third, insecure state, the processor may access a repository of one or more predetermined secure states. The processor may identify that the third state does not correspond to at least one of the one or more secure states. For example, a user may own a home-video surveillance camera, a laptop, and a desktop computer that are all connected to the IoT. The user may access the laptop and command a live-feed of the home-video surveillance while at a coffee shop. A firewall on the home-video surveillance camera gateway (e.g., a client gateway) may receive the command and access a repository of allowed actions by the home-video surveillance camera. The firewall may determine that sending a live feed to a laptop is an allowed action to be performed by the home-video surveillance camera (e.g., the first state being no streaming to the second state being the live-feed stream). The firewall may then push the command to the home-video surveillance camera (e.g., the firewall may push the command to a control unit in the home-video surveillance camera, the control unit executing the command to establish a live-feed connection) and a live-feed stream between the camera and the laptop may be generated.

The home-video surveillance camera may then receive a second command to access the desktop and forward the user's personal data to a third-party. The firewall may again access the repository of allowed actions, however, the firewall may not identify accessing or forwarding a user's personal data to a third-party in the allowable action repository. The firewall may then determine that if the second command is pushed to the home-video surveillance camera, the camera would be in an insecure state (e.g., the second state being the live-feed stream to the third state being a data stream of personal user information). The firewall may not push the second command to the home-video surveillance camera and alert the user to the attempted personal information capture. In some embodiments, the firewall may identify and validate the credentials of the entity that initiated a command. Following the example above, the firewall may additionally check that the user's laptop was the device directing the home-video surveillance camera to create a live-feed stream. This may prevent the home-video surveillance camera from establishing a live-feed with any unverified device.

In some embodiments, when determining that the second state changed to a third, insecure state, the processor may additionally access a historical data packet repository. The historical data packet repository may store information corresponding to one or more data packets previously pushed to the device. In some embodiments, the historical data packet repository may maintain all information regarding previously pushed data packets. In other embodiments, the historical data packet repository may retain information only regarding the newest preceding pushed data packet (e.g., the data packet immediate pushed before the second data packet). The processor may compare the information associated with the one or more data packets to information associated with the second data packet. The processor may identify that the information associated with the one or more data packets does not match the information associated with the second data packet.

For example, a firewall may have already determined, from manufacturer provided information, that a command would place a device in an insecure state. However, the firewall may then access historical commands that a user allowed to transpire. For example, a smart controlled house may have manufacturer information that details that when no one is in the house, all the lights should be off. However, a user may like to return home to a well-lit house. The first time the user tried to turn on their house lights while not at home, a firewall built into the smart controlled house may have identified that the command does not fall within the manufacturer provided information, nor have the lights been turned on when no one is home before. As such, the firewall may send an alert to the user. The alert may have given the user the option to override the firewall's determination to not turn any lights on. The second time the user tries to put the house lights on before coming home, the firewall will identify that turning on the house lights was previously allowed and will push the command to the smart house and allow the lights to be on. It is noted that the above-mentioned embodiments denote simulating incoming data packets in a secure environment to ensure that a device does not transition into an insecure state.

Additionally noted, some embodiments discussed below discuss sanitizing (e.g., expunge sensitive/personal data) outgoing data packets, while the device is in a secure state. The firewall may ensure that even when the next state of the device is secure, any outgoing information is adequately sanitized by removing personal and/or sensitive information. In some embodiments, the processor may send a second data packet. The processor may identify that the second data packet includes personal information associated with a user. The processor may delete the personal information form the second data packet. For example, a pair of wireless headphones may be trying to pair with a smartphone. The wireless headphones may be poorly implemented and send a blanketed command for the smartphone's "information." The wireless headphones may just mean the smartphone's connection information; however, the smartphone may read the command as all information that the smartphone can provide. In order to prevent the sending of the user's personal information to the wireless headphones and needlessly exposing the user's personal information, a firewall running on the smartphone may identify, before sending the personal information, that personal information is going to be sent to the wireless headphones. The firewall may determine that the user's personal information is not needed by the wireless headphones and delete the user's personal information. This may allow the smartphone and wireless headphones to still pair while not exposing the user's personal data. In some embodiments, what constitutes personal information may be configured in the firewall (e.g., the firewall may be programmed to determine what is personal information, such as, user name, address, credit card number, etc.).

In another example, a person trying to gain access to a user's personal information may create a data packet that asks for miscellaneous information (e.g., time, date, etc.) in addition to the user's personal information. A firewall upon receiving the data packet may push the data packet to a device running the firewall. The firewall may have determined, from the simulated execution of the data packet, that the device would not be in an insecure state. However, before the device is allowed to send the information out, the firewall may do an additional check on the actual data retrieved upon actual execution of the data packet. The firewall may then identify that personal information is being sent out, and delete the personal information. The person then only receives miscellaneous information that cannot be used to damage the user.

In some embodiments, the processor may determine that the first data packet has authority to change the first state to the second state by identifying that information associated with the first data packet corresponds to one or more commands designated to perform the change. For example, a smartphone using a universal integrated circuit card (UICC) may only be allowed to use a certain network from a certain mobile provider. The smartphone may receive a command from the certain mobile provider to verify that the smartphone has permission to use the certain mobile provider's network. A firewall on the smartphone may access the UICC and determine that the network information corresponds to information in the command that is associated with the certain mobile provider. The firewall may then push the command to the smartphone, which may then verify that the smartphone is using the correct network that is provided by the certain mobile network provider.

Referring now to FIG. 1, illustrated is a block diagram of an example system 100 for determining whether to allow a data packet 102 to be processed by a device 104, in accordance with embodiments of the present disclosure. In some embodiments, the system 100 may include a data packet 102 and a device 104 that may include a firewall 106, device data 118, an alert/halt module 120, and an execute module 116. In some embodiments, the firewall 106 may include a secure environment 108 (e.g., sandbox environment, simulated environment, etc.) and a controller 114. In some embodiments, the secure environment 108 may include a secure state repository 110 and a historical repository 112.

In some embodiments, the system 100 may generate a data packet 102, that is received at a network gateway (e.g., where most firewalls are typically located) of the device 104. Upon receiving the data packet 102, the firewall 106 may take the data packet 102 and store the data packet in the secure environment 108. The firewall 106 may simultaneously, or subsequently, retrieve device data 118 (e.g., serial number, frequency channels, IP address, etc.) and copy the device data 118 to the secure environment 108. The firewall 106 mimics the state of the device 104 in the secure environment at the exact time that the data packet 102 was received.

The firewall 106 may access the data packet 102 and execute the commands found within the data packet 102. The firewall 106 will execute the commands on the copied device data 118 in the secure environment 108. The firewall 106 will additionally access the secure state repository 110 and determine if the executed commands in the secure environment 108 correspond to a secure state identified in the secure state repository 110. The firewall 106 will further access, or while simultaneously accessing the secure state repository 110, the historical repository 112. In some embodiments, the firewall may only access the historical repository 112 after determining that the executed commands did not produce a secure state, as would be found in the secure state repository 110. The firewall may determine from the historical repository 112 if the executed commands correspond to a previously allowed state.

In some embodiments, the information of the various states (e.g., the first state, second state, secure state, insecure state, etc.) that the device 104 can be in, and the transitions between the various states, are manufacturer provided information and mimicked in the secure environment 108. This may be because, IoT devices are usually designed to be controlled via external commands, and hence there is API documentation regarding how data packets (e.g., containing commands) lead to transition between states of the device.

Upon determining that the executed commands place the secure environment 108 in a secure state or not (e.g., and thus if executed by the device 104, the device 104 in a secure state or not), the controller 114 may determine to push the data packet 102 to the execute module 116 or the alert/halt module 120. The controller 114 may determine to push the data packet 102 to the execute module 116 upon determining that the execution of the commands in the data packet 102 would leave the device 104 in a secure state. The controller 114 may determine to transfer the data packet 102 to the alert/halt module 120 upon determining that the execution of the commands in the data packet 102 would leave the device 104 in an insecure state. In some embodiments, the alert/halt module 120 may alert (e.g., text message, notify with a display action, etc.) an owner of the device 104 and allow the owner to decide to delete the data packet 102 or process the data packet 102.

Figure 2:
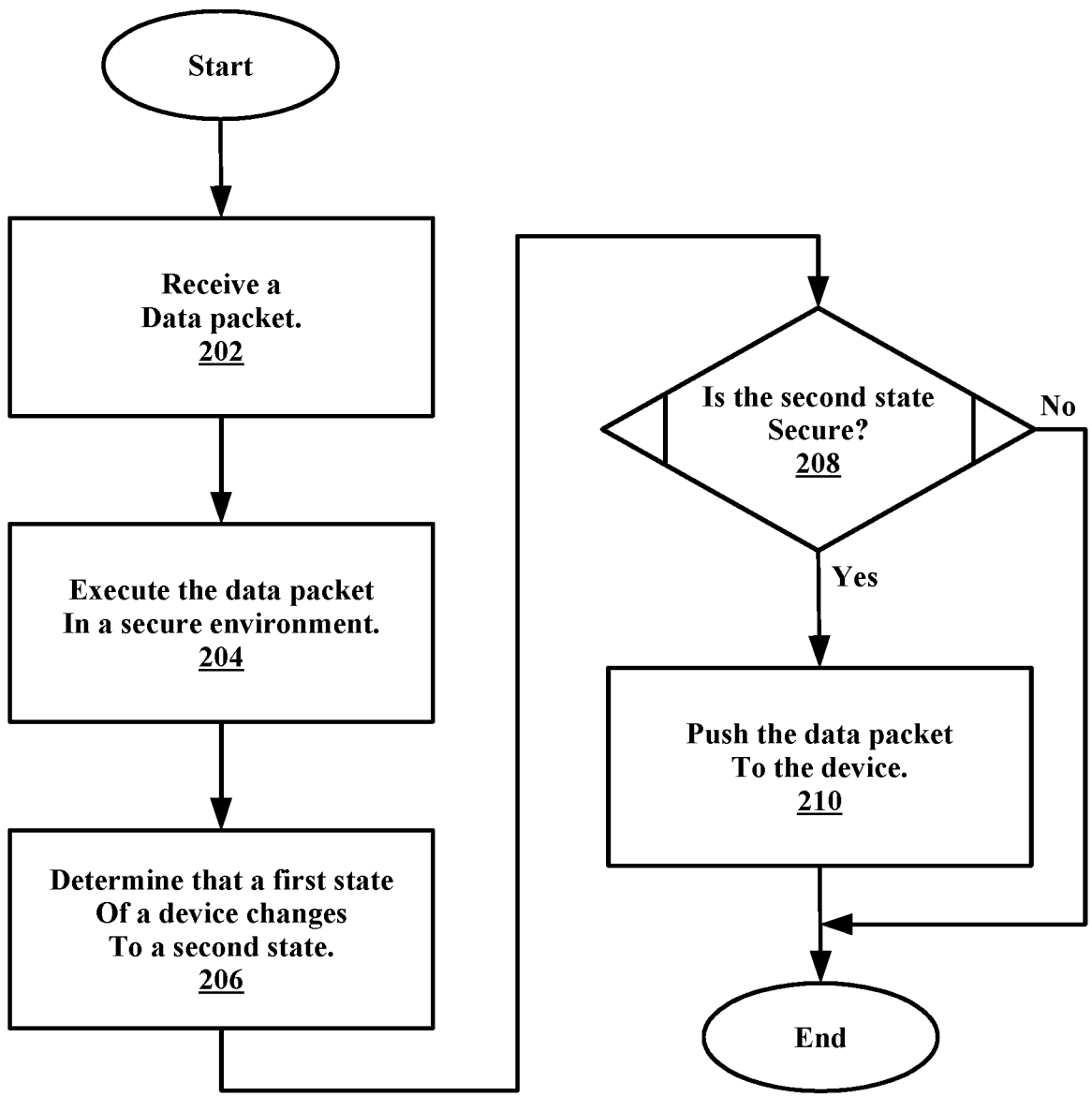
FIG. 2 illustrates a flowchart an example method for pushing a data packet to a device, in accordance with embodiments of the present disclosure.

Referring now to FIG. 2 illustrated is a flowchart of an example method 200 for pushing a data packet to a device, in accordance with embodiments of the present disclosure. In some embodiments, the method 200 may be performed by a processor. In some embodiments, the method 200 may be performed by a server. The method 200 may being at operation 202. At operation 202, a processor receives a data packet.

After operation 202, the method 200 may proceed to operation 204. At operation 204, the processor executes the data packet in a secure environment. The secure environment may simulate a state of a device at the time that the data packet is received by copying the state of the device at the (e.g., exact) time the data packet is received. The method 200 may proceed to operation 206, where the processor determines (e.g., identifies), from the execution of the data packet in the secure environment, whether the first state of the device would change to a second state if actually executed by the device.

The method 200 may proceed to decision block 208 after operation 206. At decision block 208 the processor determines if the second state of the device would be secure. The processor may determine if the device would be in a secure state by accessing multiple repositories, as detailed below in regard to FIG. 3. If it is determined at decision block 208 that the second state of the device is not secure, the method 200 may end.

If it is determined at decision block 208 that the second state of the device is secure, the method 200 may proceed to operation 210. At operation 210, the processor pushes the data packet to the device for execution by the device. In some embodiments, the device may actually process the data packet and executed the commands/information within the data packet, putting the device in the state that was simulated in the secure environment. After operation 210, the method 200 may end.

Figure 3:
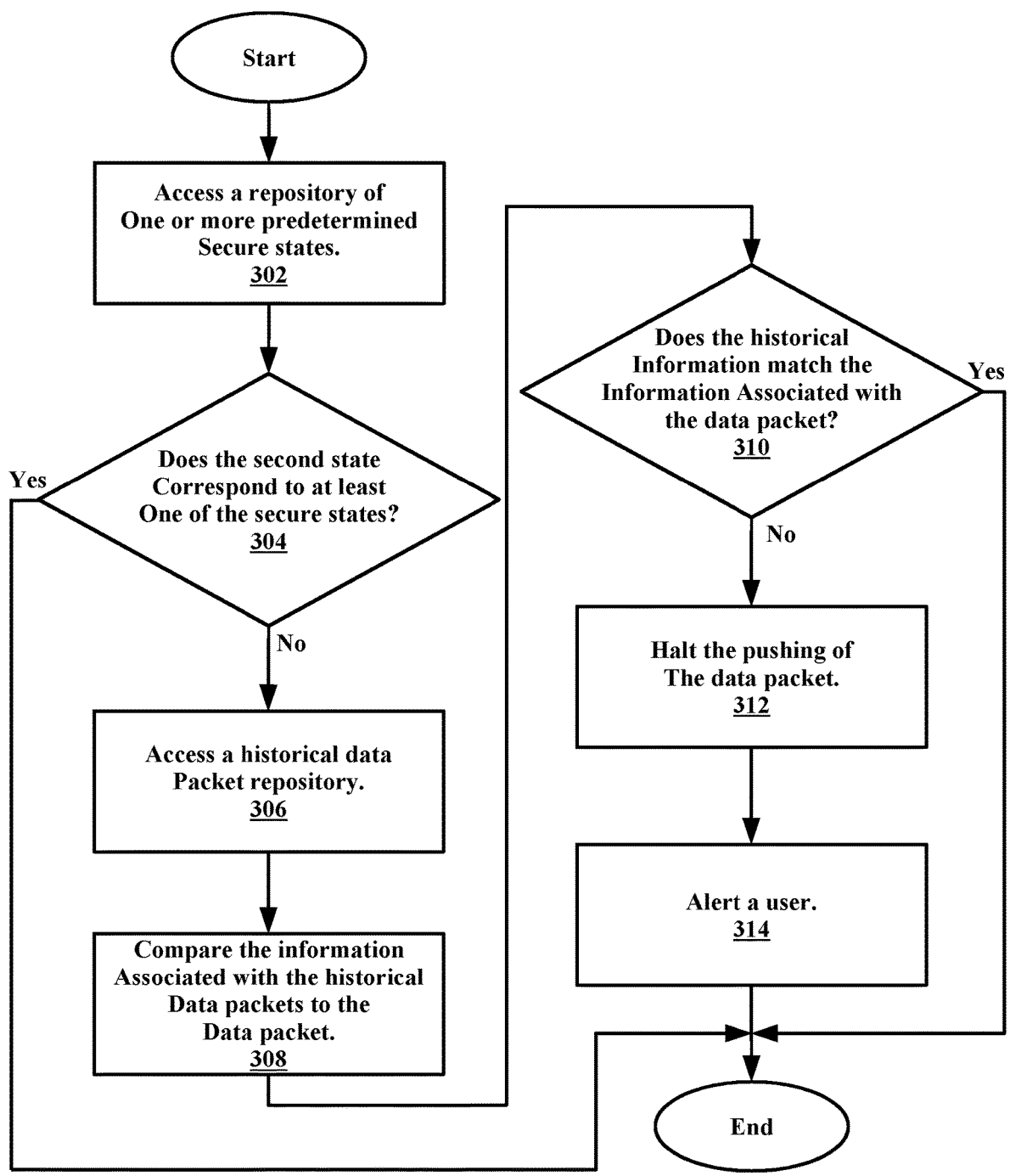
FIG. 3 illustrates a flowchart of an example method for determining if a simulated state of a device is secure, in accordance with embodiments of the present disclosure.

Referring now to FIG. 3, illustrated is a flowchart of an example method 300 for determining if a simulated state of a device is secure, in accordance with embodiments of the present disclosure. In some embodiments, the method 300 may be a continuation of decision block 208 of FIG. 2.

In some embodiments, the method 300 may begin at operation 302. At operation 302, the processor may access a repository of one or more predetermined secure states. The process may then proceed to decision block 304, where it is determined if the second state of the device in the secure environment corresponds to at least one of the predetermined secure states found in the repository of one or more predetermined secure states. If it is determined at decision block 304 that the second state does correspond to at least one of the predetermined secure states, the method 300 may end and the processor may push the data packet to the device as detailed in operation 210 of FIG. 2.

If it is determined at decision block 304 that the second state does not correspond to at least one of the predetermined secure states, the method 300 may proceed to operation 306.

At operation 306 the processor accesses a historical data packet repository. The historical data packet repository contains stored information corresponding to one or more data packets previously pushed to the device. In some embodiments, the historical data packet repository may only contain data packets that were first determined by the processor to not be pushed, but then a user allowed them to be pushed. In some embodiments, the historical data packet repository may contain all data packets ever pushed to the device (e.g., all data packets automatically pushed by the processor and pushed in response to allowance by a user).

After operation 306, the method 300 may proceed to operation 308. At operation 308, the processor compares the information associated with the historical data packets to information associated with the data packet (e.g., the information contained within the data packet, such as, commands, functions, etc.). The method 300 may then proceed to decision block 310, where the processor determines if any of the historical information matches the information associated with the data packet (e.g., the processor determines if a previously pushed packet contains the same or similar commands as the data packet). If it is determined at decision block 310 that the historical information does match the information associated with the data packet, the method 300 may end and the processor may push the data packet to the device as detailed in operation 210 of FIG. 2.

If it is determined at decision block 310 that the historical information does not match the information associated with the data packet, the method 300 may proceed to operation 312. At operation 312, the process halts the pushing of the data packet (e.g., the data packet makes no contact with the internal workings of the device and therefore has no way of possibly compromising the security of the device or the owner of the device). In some embodiments, halting the pushing of the data packet may include the processor (e.g., running software for a stateful firewall) quarantining the data packet and/or expunging the data packet.

After operation 312, the method 300 may proceed to operation 314, where the processor alerts a user (e.g., an owner of the device) to the halting of the data packet. In some embodiments, the alert may be an interactive alert that allows the user to choose to ignore the alert and allow the data packet to be pushed to the device and subsequently added to the historical data packet repository. Or the user may choose to accept the alert and have the data packet expunged from the processor. After operation 314, the method 300 may end.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third-party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third-party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
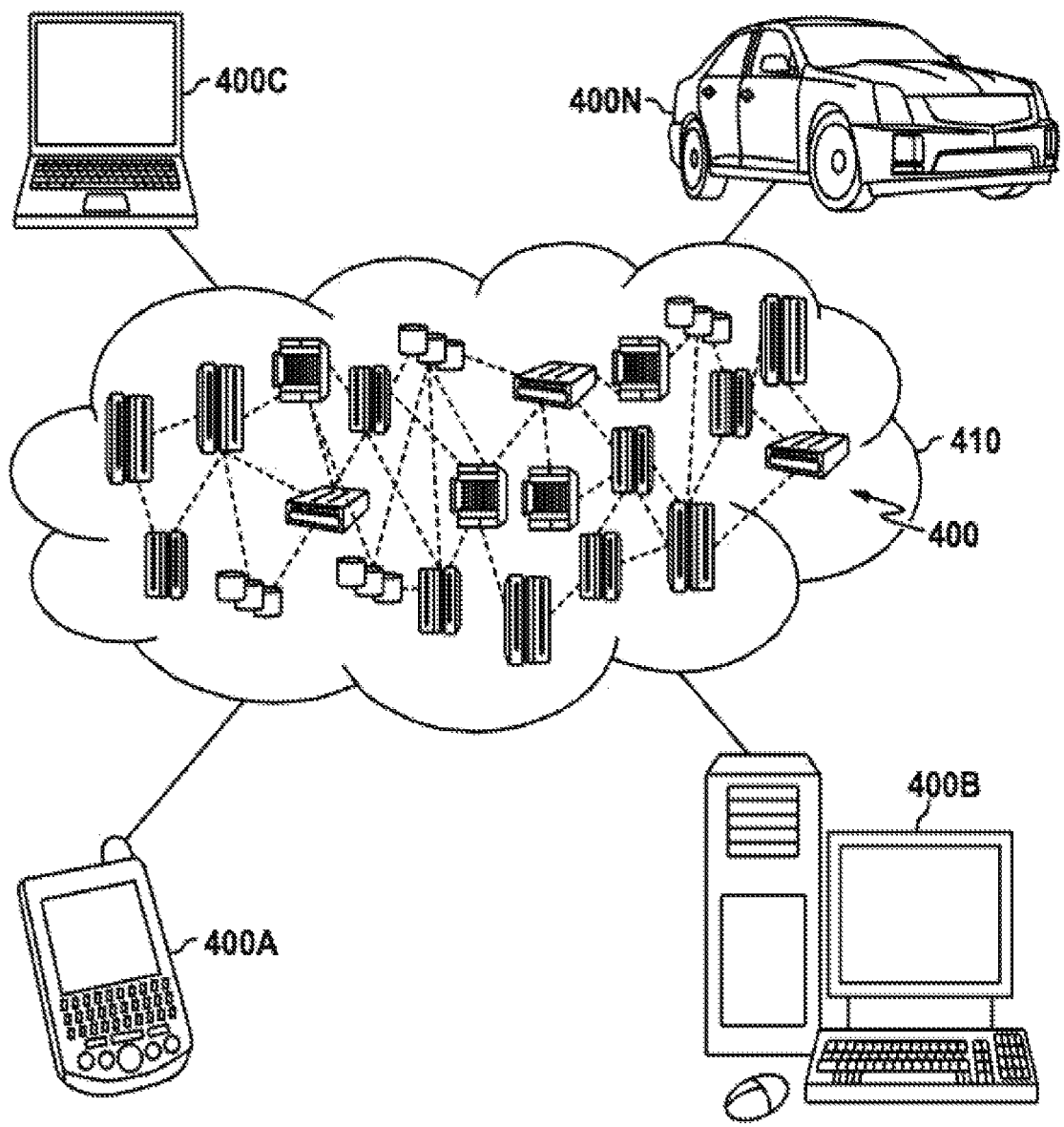
FIG. 4 depicts a cloud computing environment, in accordance with embodiments of the present disclosure.

Referring now to FIG. 4, illustrative cloud computing environment 410 is depicted. As shown, cloud computing environment 410 includes one or more cloud computing nodes 400 with which local computing devices used by cloud consumers, such as, for example, personal digital assistant (PDA) or cellular telephone 400A, desktop computer 400B, laptop computer 400C, and/or automobile computer system 400N may communicate. Nodes 400 may communicate with one another. They may be grouped (not shown) physically or virtually, in one or more networks, such as Private, Community, Public, or Hybrid clouds as described hereinabove, or a combination thereof. This allows cloud computing environment 410 to offer infrastructure, platforms and/or software as services for which a cloud consumer does not need to maintain resources on a local computing device. It is understood that the types of computing devices 400A-N shown in FIG. 4 are intended to be illustrative only and that computing nodes 400 and cloud computing environment 410 can communicate with any type of computerized device over any type of network and/or network addressable connection (e.g., using a web browser).

Figure 5:
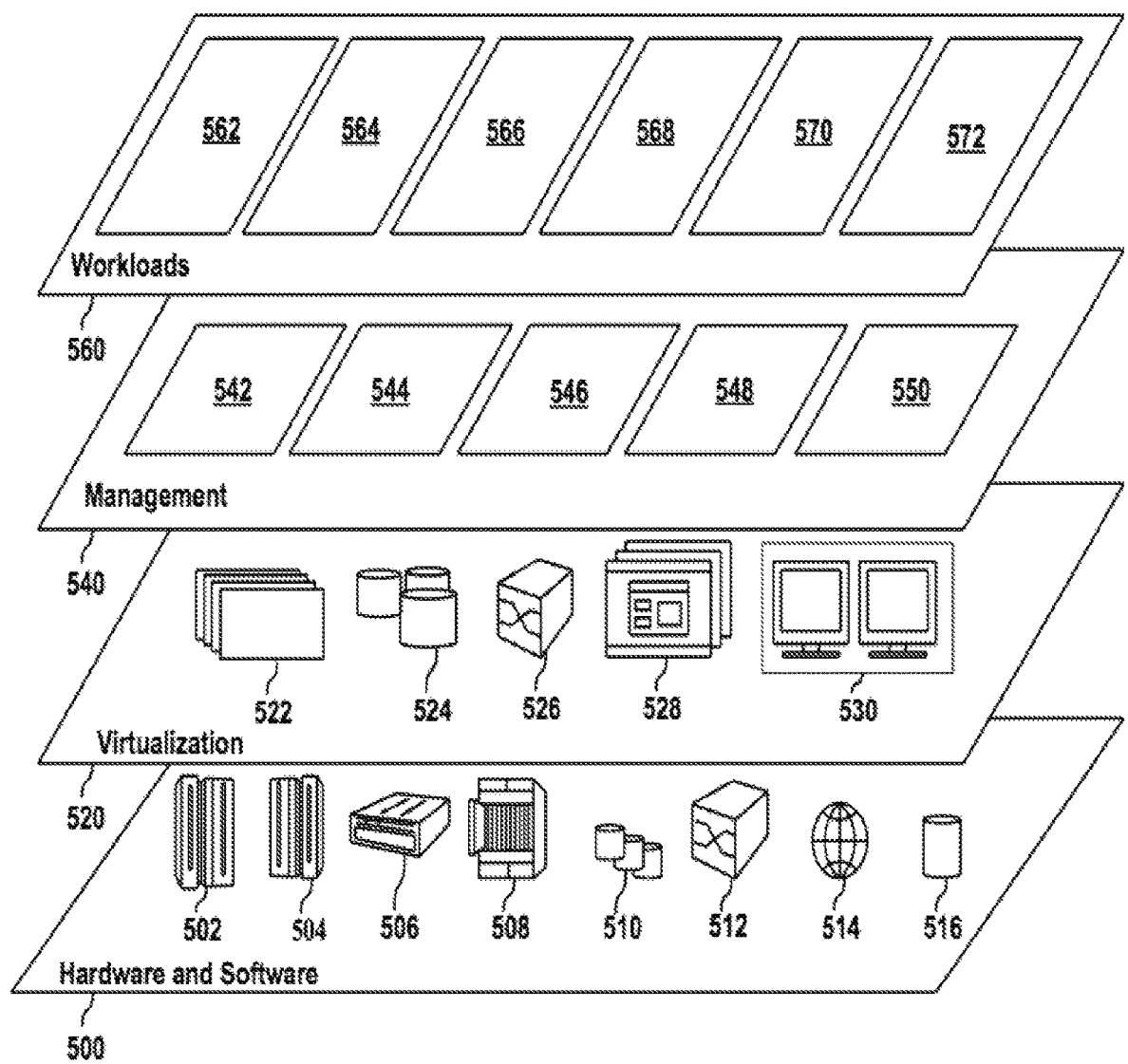
FIG. 5 depicts abstraction model layers, in accordance with embodiments of the present disclosure.

Referring now to FIG. 5, a set of functional abstraction layers provided by cloud computing environment 410 (FIG. 4) is shown. It should be understood in advance that the components, layers, and functions shown in FIG. 5 are intended to be illustrative only and embodiments of the invention are not limited thereto. As depicted below, the following layers and corresponding functions are provided.

Hardware and software layer 500 includes hardware and software components. Examples of hardware components include: mainframes 502; RISC (Reduced Instruction Set Computer) architecture based servers 504; servers 506; blade servers 508; storage devices 510; and networks and networking components 512. In some embodiments, software components include network application server software 514 and database software 516.

Virtualization layer 520 provides an abstraction layer from which the following examples of virtual entities may be provided: virtual servers 522; virtual storage 524; virtual networks 526, including virtual private networks; virtual applications and operating systems 528; and virtual clients 530.

In one example, management layer 540 may provide the functions described below. Resource provisioning 542 provides dynamic procurement of computing resources and other resources that are utilized to perform tasks within the cloud computing environment. Metering and Pricing 544 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 546 provides access to the cloud computing environment for consumers and system administrators. Service level management 548 provides cloud computing resource allocation and management such that required service levels are met. Service Level Agreement (SLA) planning and fulfillment 550 provide pre-arrangement for, and procurement of, cloud computing resources for which a future requirement is anticipated in accordance with an SLA.

Workloads layer 560 provides examples of functionality for which the cloud computing environment may be utilized. Examples of workloads and functions which may be provided from this layer include: mapping and navigation 562; software development and lifecycle management 564; virtual classroom education delivery 566; data analytics processing 568; transaction processing 570; and determining to push a data packet to a device 572.

Figure 6:
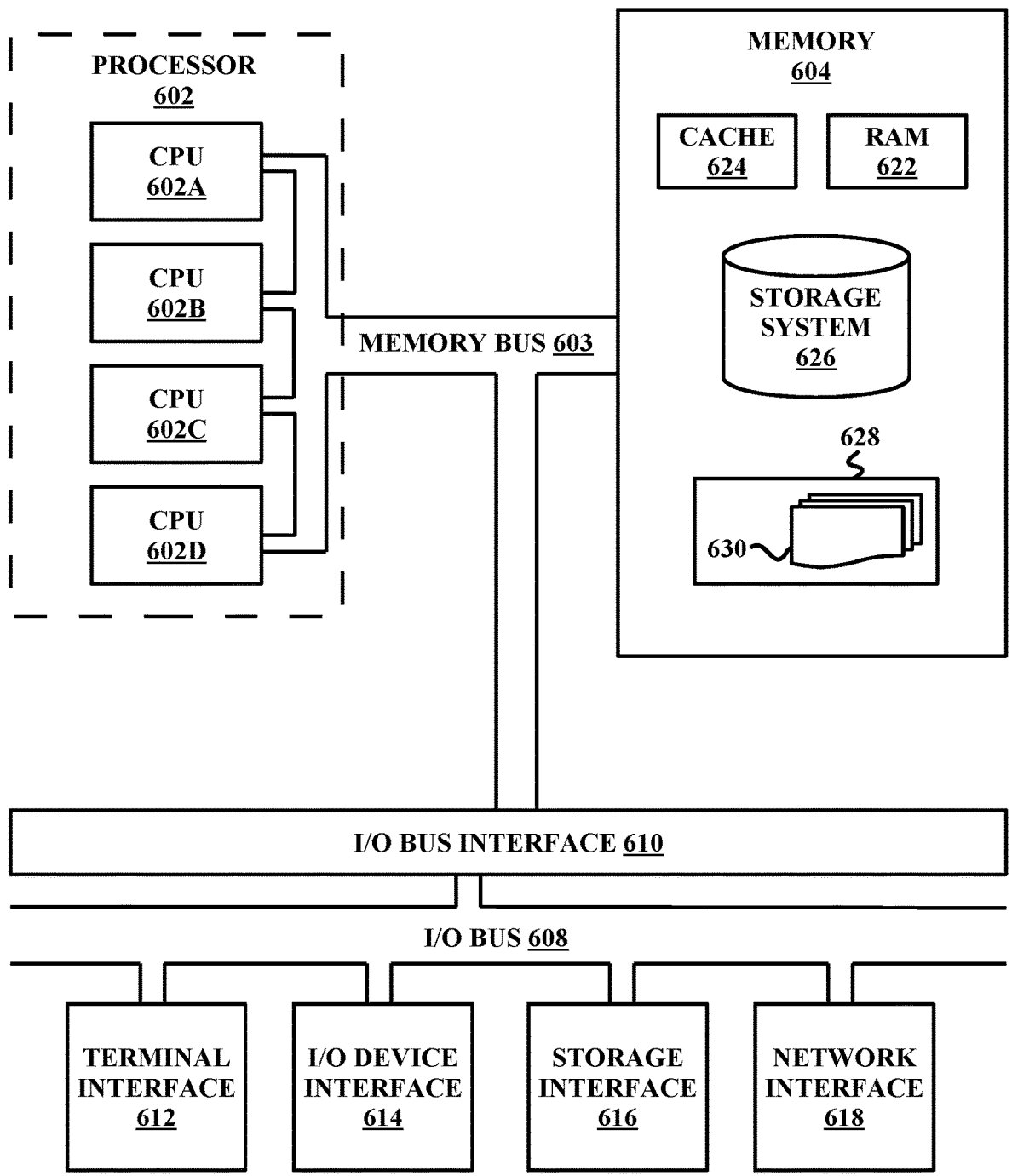
FIG. 6 illustrates a high-level block diagram of an example computer system that may be used in implementing one or more of the methods, tools, and modules, and any related functions, described herein, in accordance with embodiments of the present disclosure.

Referring now to FIG. 6, shown is a high-level block diagram of an example computer system 601 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 601 may comprise one or more CPUs 602, a memory subsystem 604, a terminal interface 612, a storage interface 616, an I/O (Input/Output) device interface 614, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may include one or more levels of on-board cache.

System memory 604 may include computer system readable media in the form of volatile memory, such as random access memory (RAM) 622 or cache memory 624. Computer system 601 may further include other removable/non-removable, volatile/non-volatile computer system storage media. By way of example only, storage system 626 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

One or more programs/utilities 628, each having at least one set of program modules 630 may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 628 and/or program modules 630 generally perform the functions or methodologies of various embodiments.

Although the memory bus 603 is shown in FIG. 6 as a single bus structure providing a direct communication path among the CPUs 602, the memory subsystem 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method comprising:
  receiving, by a processor, a first data packet, wherein the first data packet is received from a second device, wherein the first data packet includes a general command for an internet-of-things (IoT) device;
  executing the first data packet including the general command for the IoT device in a secure environment, wherein the secure environment is a sandbox environment that is separate from a runtime environment that controls the IoT device, wherein the secure environment simulates a first state of the IoT device by taking a snapshot of the IoT device in an actual state at a point in time in which the first data packet including the general command for the IoT device is received, and wherein the IoT device includes a firewall;

determining, from the execution of the general command for the IoT device in the first data packet in the secure environment, that the first state changed to a second state;

identifying that the second state is a predetermined secure state;

pushing the first data packet to the IoT device in response to identifying that the second state is the predetermined secure state; and executing the first data packet on the IoT device;

generating a response to the general command;

identifying, by the firewall, that the response to the general command from the IoT device includes personal information associated with a user;

identifying that the second device does not require the personal information to function;

deleting the personal information from the response to the general command from the IoT device, wherein the processor utilizes the firewall to delete the personal information; and sending the response to the general command to the second device.

2. The method of claim 1, wherein determining that the first state changed to the second, predetermined secure state comprises:

accessing a repository of one or more predetermined secure states; and identifying that the second state corresponds to at least one of the one or more predetermined secure states.

3. The method of claim 1, further comprising:

receiving a second data packet;

executing the second data packet in the secure environment, the secure environment simulating the second state of the IoT device;

determining, from the execution of the second data packet, that the second state changed to a third state;

identifying that the third state is an insecure state;

halting the pushing of the second data packet to the IoT device in response to identifying that the third state is the insecure state; and alerting a user to the halting.

4. The method of claim 3, wherein determining that the second state changed to the third state comprises:

accessing a repository of one or more predetermined secure states; and identifying that the third state does not correspond to at least one of the one or more predetermined secure states.

5. The method of claim 4, further comprising:

accessing a historical data packet repository, the historical data packet repository storing information corresponding to one or more data packets previously pushed to the IoT device;

comparing the information associated with the one or more data packets to information associated with the second data packet; and identifying that the information associated with the one or more data packets does not match the information associated with the second data packet.

6. The method of claim 1, further comprising:

determining that the first data packet has authority to change the first state to the second state by identifying information associated with the first data packet corresponds to one or more commands designated to perform the change.

7. A system comprising:

a memory; and a processor in communication with the memory, the processor being configured to perform operations comprising:

receiving a first data packet, wherein the first data packet is received from a second device, wherein the first data packet includes a general command for an internet-of-things (IoT) device;

executing the first data packet including the general command for the IoT device in a secure environment, wherein the secure environment is a sandbox environment that is separate from a runtime environment that controls the IoT device, wherein the secure environment simulates a first state of the IoT device by taking a snapshot of the device in an actual state at a point in time in which the first data packet including the general command for the IoT device is received, and wherein the IoT device includes a firewall;

determining, from the execution of the general command for the IoT device in the first data packet in the secure environment, that the first state changed to a second state;

identifying that the second state is a predetermined secure state;

pushing the first data packet to the IoT device in response to identifying that the second state is the predetermined secure state; and executing the first data packet on the IoT device;

generating a response to the general command;

identifying, by the firewall, that the response to the general command from the IoT device includes personal information associated with a user;

identifying that a second device does not require the personal information to function;

deleting the personal information from the response to the general command from the IoT device, wherein the processor utilizes the firewall to delete the personal information; and sending the response to the general command to the second device.

8. The system of claim 7, wherein determining that the first state changed to the second, predetermined secure state comprises:

accessing a repository of one or more predetermined secure states; and identifying that the second state corresponds to at least one of the one or more predetermined secure states.

9. The system of claim 7, further comprising:

receiving a second data packet;

executing the second data packet in the secure environment, the secure environment simulating the second state of the IoT device;

determining, from the execution of the second data packet, that the second state changed to a third state;

identifying that the third state is an insecure state;

halting the pushing of the second data packet to the IoT device in response to identifying that the third state is the insecure state; and alerting a user to the halting.

10. The system of claim 9, wherein determining that the second state changed to the third state comprises:
- accessing a repository of the one or more predetermined secure states; and
- identifying that the third state does not correspond to at least one of the one or more predetermined secure states.

11. The system of claim 10, further comprising:
- accessing a historical data packet repository, the historical data packet repository storing information corresponding to one or more data packets previously pushed to the IoT device;
- comparing the information associated with the one or more data packets to information associated with the second data packet; and
- identifying that the information associated with the one or more data packets does not match the information associated with the second data packet.

12. The system of claim 7, further comprising:
- determining that the first data packet has authority to change the first state to the second state by identifying information associated with the first data packet corresponds to one or more commands designated to perform the change.

* * * * *